United States Patent
Axenfeld

[19]

[11] Patent Number: 5,991,886

[45] Date of Patent: Nov. 23, 1999

[54] PORTABLE ELECTRONIC DEVICE HAVING A TRAVEL MODE FOR USE WHEN DEMONSTRATING OPERABILITY OF THE DEVICE TO SECURITY PERSONNEL

[75] Inventor: Robert Roy Axenfeld, Allentown, Pa.

[73] Assignee: Lucent Technologies Inc., Murray Hill, N.J.

[21] Appl. No.: 08/929,710

[22] Filed: Sep. 15, 1997

[51] Int. Cl.$^6$ .................................................. G06F 11/32
[52] U.S. Cl. ................................ 713/300; 713/1; 714/24
[58] Field of Search .................................. 395/651, 652, 395/653, 182.13, 182.21, 182.22, 750, 183.12; 371/22.5; 713/300–340, 1, 2, 700; 714/23, 24

[56] References Cited

U.S. PATENT DOCUMENTS 5,410,713  4/1995  White et al. ...................... 395/183.12

*Primary Examiner*—Glenn A. Auve
*Assistant Examiner*—Rupal D. Dharia

[57] ABSTRACT

A portable electronic device having a travel mode for use when demonstrating operability of the device to security personnel, for instance at airport security check points. The travel mode allows the portable device, such as a portable computer, to be turned-on and thereafter turned-off without delay. The travel mode also permits the portable device to simulate attributes of the computer device when the computer device is functioning in a mode other than said travel mode. For instance, the travel mode permits the portable device to make a sound, activate an LED and/or activate a display screen of the device to sufficiently satisfy security concerns without the need to launch application software. The travel mode helps to protect the integrity of firmware/ software configurations stored in portable computers, when the computer is powered-down shortly after being turned-on.

13 Claims, 2 Drawing Sheets

PORTABLE ELECTRONIC DEVICE HAVING A TRAVEL MODE FOR USE WHEN DEMONSTRATING OPERABILITY OF THE DEVICE TO SECURITY PERSONNEL

BACKGROUND OF THE INVENTION

1. Field of the Invention

The present invention relates generally to portable electronic devices, and more specifically, to portable computers, laptops, notebooks, and other related portable devices.

2. Related Art

Current security measures in most airports throughout the world subject travelers with carry-on portable electronic portable devices, such as laptops, to extra scrutiny. Typically, the traveler with a laptop is required to power-it-up, purportedly to demonstrate to security that the laptop is not masquerading as a more insidious device, such as a bomb. Usually, within a few seconds of pressing the start-up button, and once the laptop produces sound and/or screen activation, the security personnel are satisfied and ask the traveler to turn-off the computer and leave the security area.

Deactivation of a laptop before it is fully activated can damage the file management of the computer. Additionally, some portable computers will not turn-off until they reach a point in their protocol start-up to permit deactivation. Besides the delay and inconveniences associated with waiting for proper deactivation, there are other problems associated with attempting to turn-off a portable computer prematurely such as depletion of battery reserves, "false turn-offs,", and other related problems.

In particular, a false turn-off occurs when a computer appears to be shutting-down, but remains on. Frequently, the airport traveler is in a hurry, and after pressing the on/off button to turn-off the laptop, the traveler believes the laptop is powering down because it "beeps;" when in fact, the laptop remains in an on-state. At this point the traveler usually places the laptop in a travel bag with the laptop running, which can completely deplete the battery reserve before the user realizes it is on. Moreover, the laptop encounters dangerous heat levels, since it is running in an enclosed environment, typically in a travel bag, with no air circulation or ventilation.

Thus, what is a needed is a convenient a way to allow travelers to turn-on and shortly thereafter, instantaneously turn-off their electronic portable device without damaging the hardware, the operating system, and system and memory configurations associated with the device. This solution would be especially convenient for business travelers who transport their laptops, as carry-on luggage, through airports.

SUMMARY OF THE INVENTION

The present invention is directed to portable electronic device having a travel mode for use when demonstrating operability of the device to security personnel. In one illustrious embodiment, a portable computer device includes a travel mode that allows the computer device to be turned-on and thereafter turned-off without delay and also permits the computer device to execute attributes typically associated when the computer device is initially turned-on.

In the figures, arrows between elements denote paths linking signals and/or information. Such paths may be a bus, wire, optic fiber and the like in hardware applications or a logical connection for the transfer of information in software applications or a combination in hybrid hardware/software systems.

Detailed Description of the Invention

Figure 1:
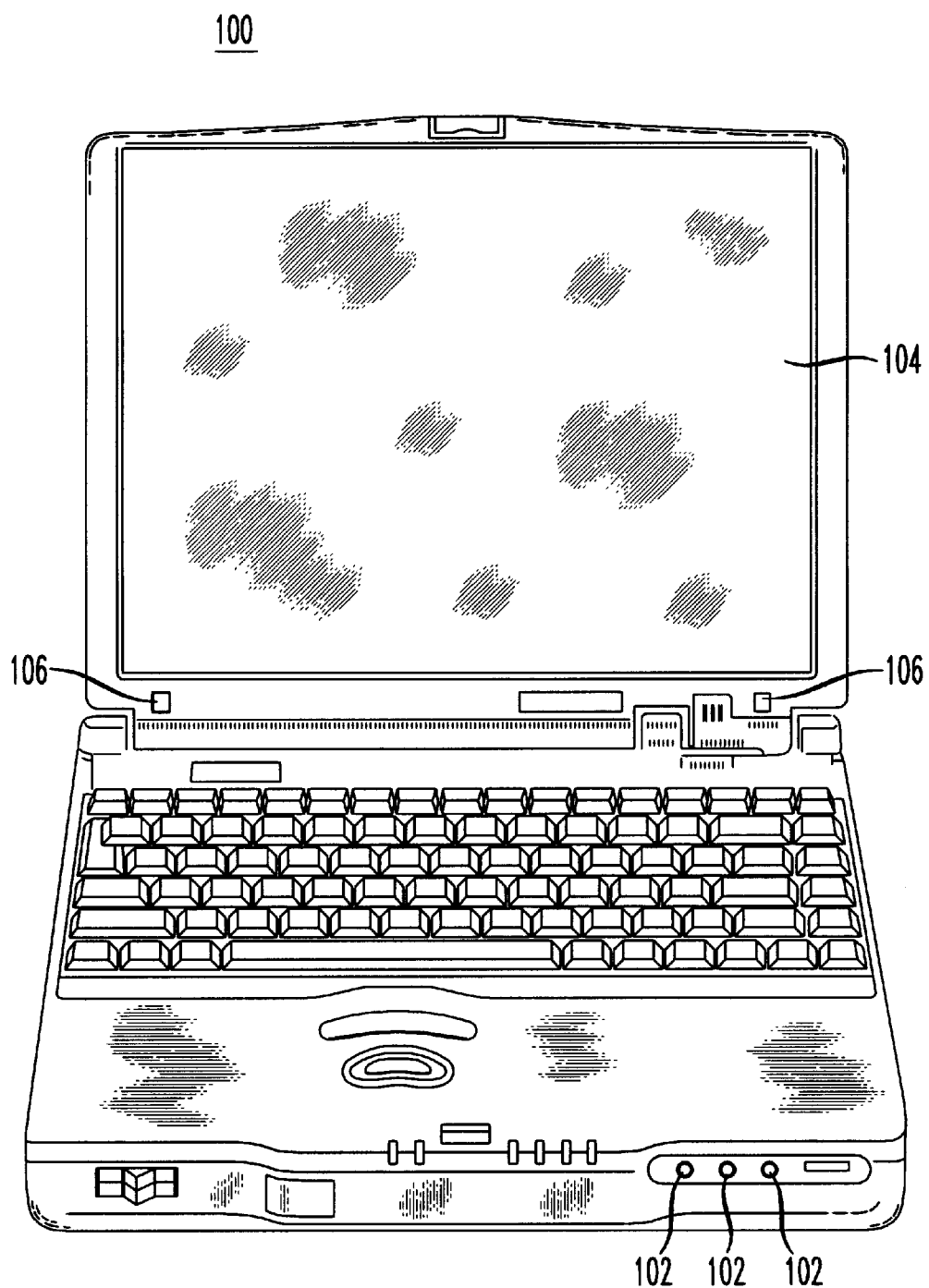
FIG. 1 is a sample illustration of the type of portable electronic device that can be implemented in accordance with the principles of the present invention.

The present invention is directed to portable electronic device having a travel mode for use when demonstrating operability of the device to security personnel. FIG. 1 is a sample illustration of the type of portable electronic device that can be implemented in accordance with the principles of the present invention. In this example, the electronic device is a portable personal computer 100 and includes display lights, such as liquid emitter diodes (LEDs) 102, a display screen 104 and left and right loud speakers 106. Typically, most laptop computers shortly after being turned-on enter a start-up mode wherein the display lights 102 are activated, the display screen 104 is activated and diagnostic beeps or music is generated by the loud speakers 106. It is these type of attributes that security personnel are interested in observing when a traveler turns-on the computer 100 to demonstrate its operability (and to lessen the threat that the device is masquerading as more insidious device).

As explained above, the problems occur when the computer 100 is turned-off shortly after the computer 100 initiates operation. Thus, according to the principles of the present invention, a personal portable computer 100 includes a travel mode that allows the computer 100 to duplicate or substantially simulate attributes of the device (e.g., sound, display screen activation, LED activation) when the computer initiates operation without actually launching software that could be corrupted or might lock-up the computer 100 from deactivating.

Figure 2:
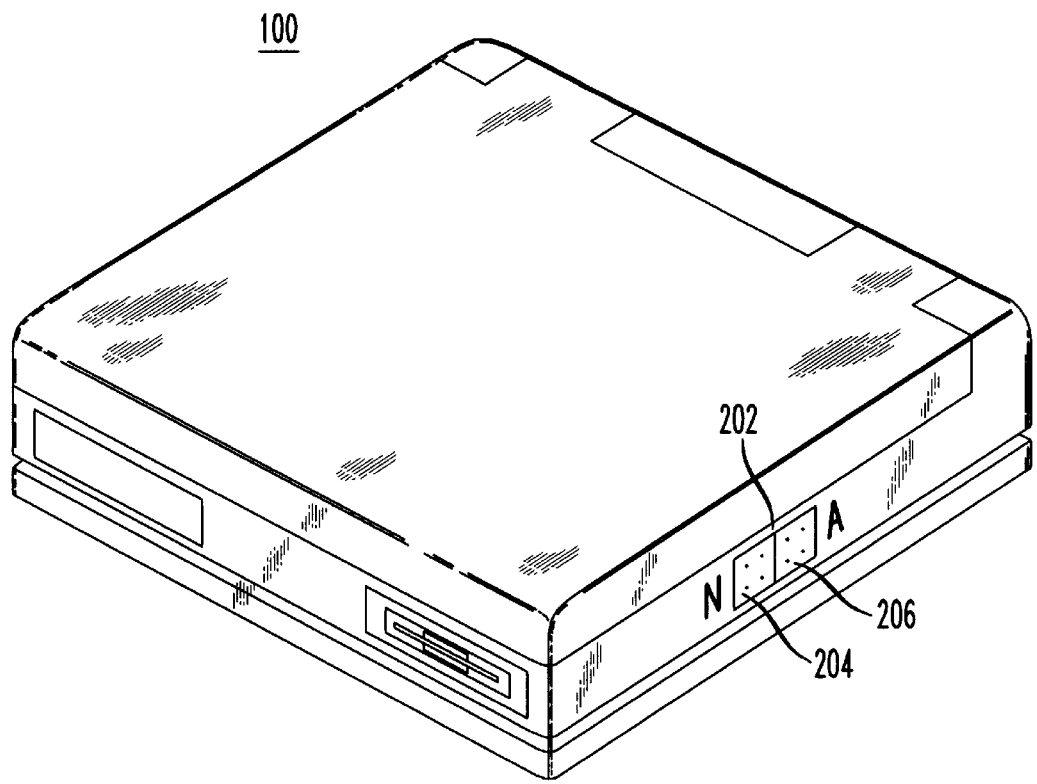
FIG. 2 illustrates a side view of the personal portable computer 100, showing in particular, the on/off button 202 according to the general principles of the present invention.

FIG. 2 illustrates a side view of the personal portable computer 100, showing in particular, the on/off button 202 according to the general principles of the present invention. The button 202 includes two sections: a normal mode section (denoted N) 204 and an airport mode section (denoted A and the same as the traveler mode) 206. Accordingly, if a user of the portable computer 100 is traveling, the user can initiate the traveler mode by depressing the airport section 206 instead of the normal mode section 204. This button 202 activates in accordance with the mode selected by the user. It is envisioned that there are many other ways to initiate activation of the travel mode, for example, by pressing the on/off button in coded fashion (e.g., twice to initiate the traveler mode).

The travel mode may be implemented in either hardware, firmware, and/or software. In a software embodiment, it is envisioned that the travel mode is a series of instructions (code) stored on a disk or loaded into ROM (not shown) of the portable personal computer 100. If a flag is set (not shown) indicating that the travel mode is selected, then the computer central processing unit (CPU) (not shown) after completing various internal reset procedures to gain a stable state, executes the code stored in the ROM until the device is deactivated or after some period of time (for instance, greater than five minutes) the system may initiate normal boot-up. It is probably preferable for the travel mode to reside in a high layer of software as boot program. For instance, if the CPU does not have to execute basic input/ output system software (BIOS), there is less delay in deactivating the computer 100 and less chance for corrupting files and/or data. So, if possible it is desirable to locate the travel mode software before the BIOS or in a patch of the BIOS, but before system software or application software needs to be launched.

Whether implemented in a hardware, firmware, or software, the computer 100 in a travel mode performs a sequence of activities that simulates (or substantially duplicates) the operation of the computer when it is first powered-on. All that is required for simulation is that security personnel may be satisfied that the device functions as a portable personal computer is supposed to operate when initially turned-on. It is not necessary that the device actually function for any other purpose in the travel mode, although it is possible.

Figure 3:
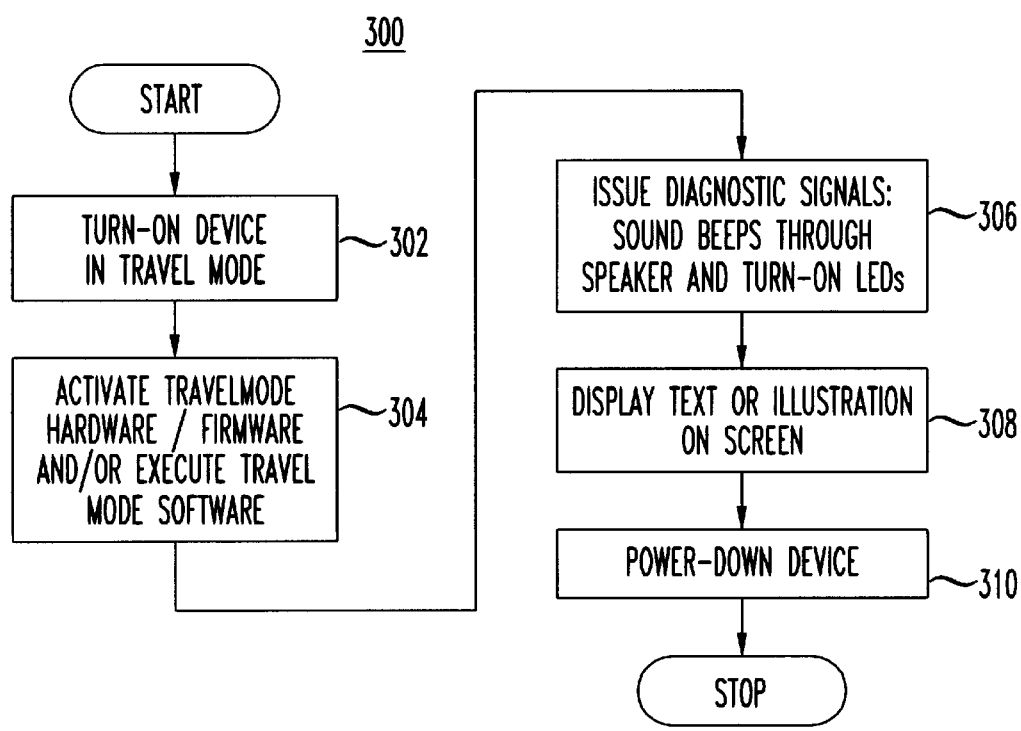
FIG. 3 is a flow chart illustrating a general sequence of operation for the travel mode 300 according the general principles of the present invention.

FIG. 3 is a flow chart illustrating a general sequence of operation for the travel mode 300 according the general principles of the present invention. Essentially, steps 302–310 represent the operation of typical laptop computer after it is initially turned-off. Most laptops generate sound, LED activation and/or screen activation. Accordingly, in step 302 the device is turned-on in the travel mode. The travel mode can be either selected prior to turning off the computer previously or initiated as described above in some fashion such as by depressing the airport section of button 206.

Next, in a step 304, the computer 100 activates the hardware (e.g., a control unit) or software via a CPU executing code after completing initial stabilization. In step 306, the computer in accordance with the travel mode 300, issues a customized routine of attributes. For instance, in one example routine the computer 100 issues diagnostic signals: sounds beeps through the loud speaker 106 and activates the LEDs 102. Another attribute, is for the computer screen to activate and dynamic and/or static text and/or illustration(s). The order of steps 306 and 308 can be switched, intertwined, performed simultaneously, repeated, etc. just as long as the computer 100 appears to be actually functioning as it would normally after being turned-on. Finally, in step 310, the computer 100 is turned-off by depressing switch 206 for instance. And since, the travel mode is implemented in hardware, firmware, and/or software (preferably stored as boot software in ROM) the system can shut-down with no noticeable delay to the user as compared to when the computer is locked-up as explained above.

While exemplary embodiments have been set forth, various modifications, alterations, and changes may be made without departing from the spirit and scope of the present invention as defined in the specification and in the appended claims.

What is claimed is:

1. A portable computer device comprising a travel mode including a boot software program configured to initiate operation of said portable computer device without launching operating system software, said travel mode allowing said portable computer device to be turned-on and thereafter instantaneously turned-off without a noticeable delay and for executing at least one attribute when said portable computer device is initially turned-on.

2. The portable computer device of claim 1 wherein said travel mode includes means for generating at least one sound whenever said portable computer device initiates operation.

3. The portable computer device of claim 1 wherein said travel mode includes means for activating a display screen whenever said portable computer device initiates operation.

4. The portable computer device of claim 1 wherein said travel mode includes means for activating a display light whenever said portable computer device initiates operation.

5. The portable computer device of claim 1 wherein said boot software program is configured to initiate operation of said portable computer device without launching basic input and output system software.

6. The portable computer device of claim 1 wherein said travel mode includes a controller for activating a display screen, a display light and at least one sound upon said portable computer device initiating operation.

7. A method for starting operation of a portable electronic device to demonstrate to security personnel that said portable electronic device is operational, comprising:

(a) initiating operation of said portable electronic device;

(b) activating a display screen;

(c) generating at least one sound;

(d) performing (a), (b) and (c) without fully executing system configuration programs necessary to operate said portable electronic device; and (e) allowing said portable electronic device to be instantaneously deactivated without a noticeable delay during performance of any one of (a) through (c) and thereafter.

8. The method of claim 7 further including activating a visual light located on said portable electronic device after initiating operation of said portable electronic device.

9. A portable electronic device comprising travel mode software configured to permit said portable electronic device to be instantaneously turned-off without a noticeable delay at a time when said portable electronic device initiates operation, said travel mode software, comprising:

a boot software program configured to initiate operation of said portable electronic device without launching basic input and output system software; and means for activating an illustration on a display screen thereby eliminating said noticeable delay after travelers are required to demonstrate to security personnel that said portable electronic device is operational.

10. The portable electronic device of claim 9 further comprising means for generating a sound.

11. Travel mode software for installation on a portable personal computer, comprising:

(a) an instruction to launch said travel mode software on a processing unit whenever said portable personal computer completes initial automatic startup protocols required for a central processing unit to reach stability; and (b) a second instruction to activate an illustration on a display screen, said software not requiring any other software programs to be launched and enabling said portable personal computer to be instantaneously deactivated without a noticeable delay without corrupting file configurations stored in said portable personal computer.

12. The travel mode software of claim 11 further comprising a third instruction for said portable personal computer to activate a display light located on said portable personal computer.

13. The travel mode software of claim 11 further comprising a fourth instruction for said portable personal computer to generate at least one sound.

* * * * *